Jan. 11, 1949.    K. RATH    2,458,731
ELECTRICAL FOLLOW-UP APPARATUS
Filed Jan. 20, 1944    3 Sheets-Sheet 1
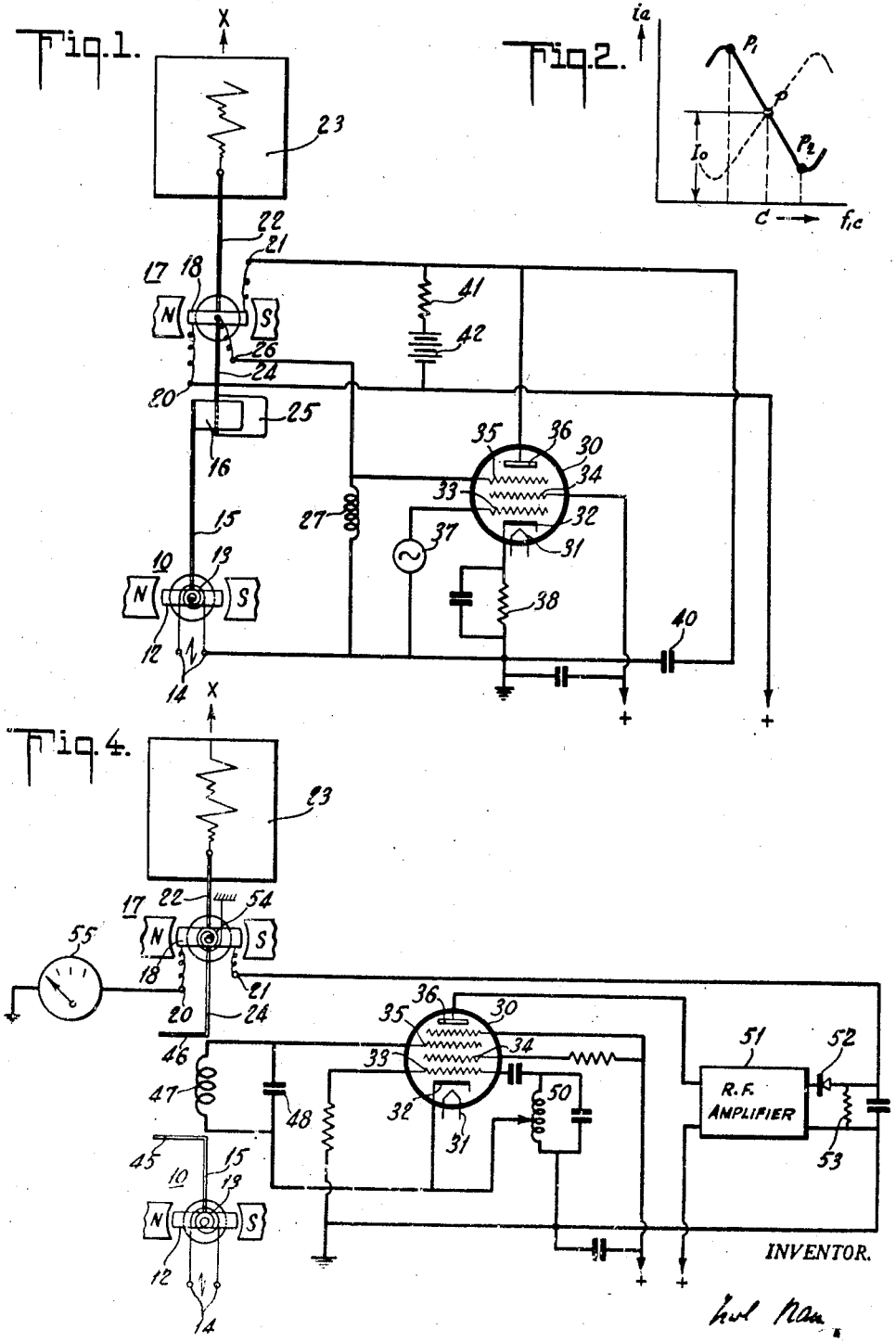
INVENTOR.

INVENTOR.

Jan. 11, 1949.　　　　　K. RATH　　　　　2,458,731
ELECTRICAL FOLLOW-UP APPARATUS
Filed Jan. 20, 1944　　　　　　　　　　　3 Sheets-Sheet 3
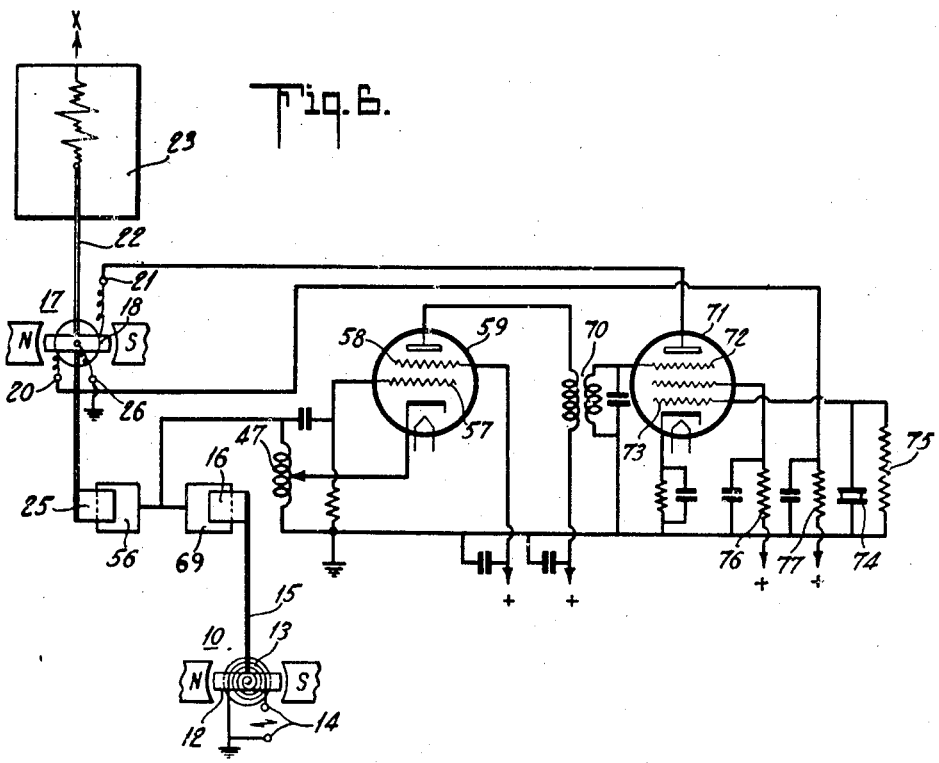
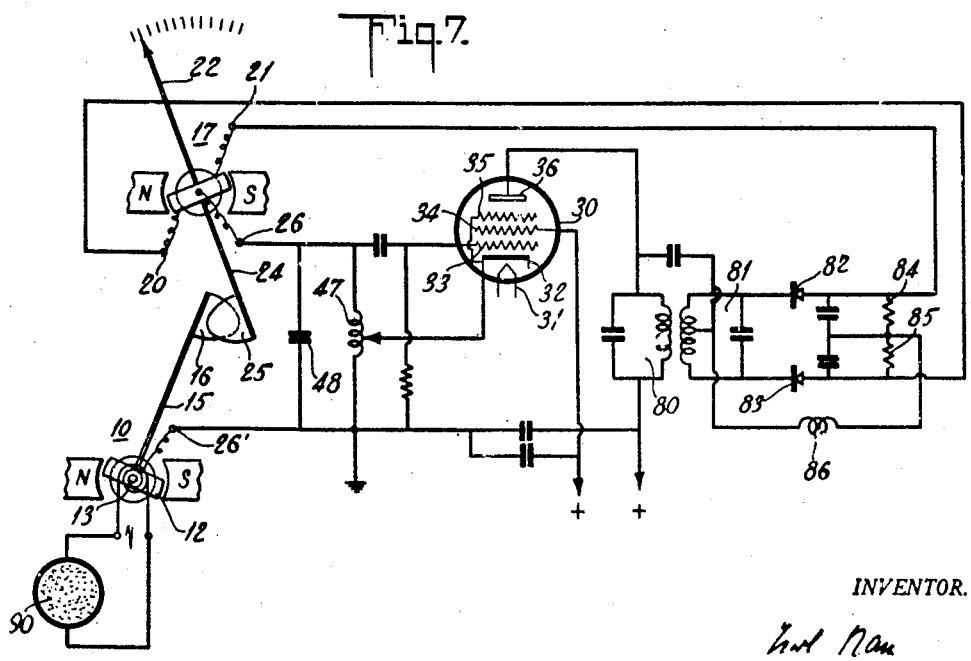
INVENTOR.

Patented Jan. 11, 1949

2,458,731

UNITED STATES PATENT OFFICE 2,458,731

ELECTRICAL FOLLOW-UP APPARATUS

Karl Rath, New York, N. Y., assignor to Radio Patents Corporation, New York, N. Y., a corporation of New York Application January 20, 1944, Serial No. 519,003

3 Claims. (Cl. 318—28)

My invention relates to follow-up type translating systems for amplifying small input currents or potentials normally unsuited or insufficient for exciting the input of a standard amplifier tube, such as the currents supplied by photo-voltaic cells, thermo-electric elements or any other source of weak current or potential varying in response to a variable magnitude or condition to be indicated, recorded or otherwise utilized for operating an output or translating device.

Known arrangements of this type make use of a balanced photoelectric system and Wheatstone bridge circuit adapted to be unbalanced in accordance with an initial current variation in response to a variation of the magnitude or condition to be indicated or translated, by the aid of a highly sensitive primary or basic device in the form of a galvanometer serving as off-balance detector. The off-balance or output current, upon adequate amplification, is utilized to counteract or compensate the effect of the initial current variation, whereby to restore and maintain the balance of the system. As a result of this continuous balancing action, the output current follows the initial current variation and may be utilized to operate a relatively heavy recorder or other translating device compared with the sensitive basic element or galvanometer.

Systems of this type known in the art suffer both from mechanical and electrical shortcomings in that elaborate optical devices are required, resulting in substantial bulk and size of the apparatus, and in that the balance of the current or potentials of the bridge circuit and the sensitivity to an incipient off-balance thereof can be maintained only with difficulty.

In my co-pending application, Serial No. 504,107, filed September 9, 1943, now Patent No. 2,446,390, patented August 3, 1948, entitled "Potentiometric amplifier," I have described a system of the above type utilizing a frequency or resonance balancing arrangement compared with the current or voltage balancing by means of a compensating or bridge circuit, in connection with an electrical feed-back to maintain the balance condition, or, in other words, to compensate or balance the initial input current variations to be amplified or translated. For this purpose, a portion of the off-balance output current of a frequency or resonance balancing system is passed in the proper direction through a small electrical resistance inserted in the input circuit to produce a voltage drop counteracting the initial current or potential variations to be indicated, recorded or otherwise utilized in the output circuit. Arrangements of this type are also known as potentiometric balancing or translating systems.

In the practical realization of this system and method, use is made of a frequency balance between a source of high frequency energy and the natural or resonant frequency of a suitable resonating means such as a tuned circuit, piezo-electric crystal, etc. as a means for detecting an incipient off-balance condition in response to an input magnitude change and for instantly restoring and maintaining the balance of the system. The advantages of a frequency rather than current or voltage balance, among others, consist in both greatly increased response sensitivity, mechanical simplicity, and various other desirable features compared with known follow-up or feedback type balanced translating systems.

The present invention has for its object to provide a translating system of this type, wherein the balance condition is maintained by simple mechanical means by utilizing the movement of the secondary or translating device such as a meter, recorder, or the like to produce a corresponding change of the resonating frequency of a tuned circuit or other resonant discriminating means forming part of the frequency discriminator to maintain the balance of the system.

Another object of the invention is to provide a system of this character which is both simple in design as well as highly sensitive and reliable in operation compared with balanced translating systems of similar type known in the prior art.

A further object is the provision of a system of the above character, wherein the mechanical parts and other elements are reduced to a minimum, resulting in substantial design simplification and compactness of the apparatus.

Still another object is to provide means, whereby the system can be constantly adjusted and/or rebalanced in a most simple manner, whereby to insure maximum operating efficiency and accuracy under all circumstances.

The above and further objects and aspects of my invention will become more apparent from the following detailed description taken in reference to the accompanying drawings forming part of this specification, and wherein:

Figure 1 is a schematic circuit diagram of a recording or translating system embodying the principles of the invention;

Figure 2 is a graph explanatory of the function and operation of the circuit shown in Figure 1;

Figures 4, 5, 5a, 6 and 7 are schematic circuit diagrams illustrating various further modifications of practical embodiments of the invention.

Like reference characters identify like parts throughout the different views of the drawings.

Figure 3:
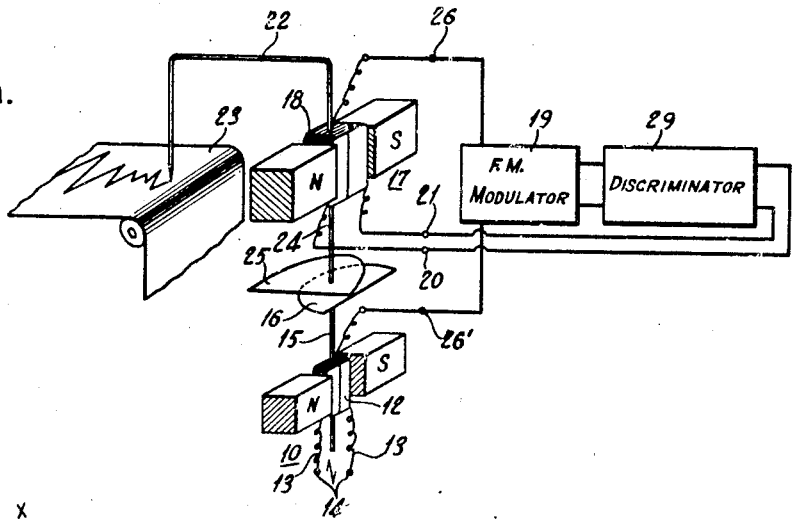
Figure 3 is a schematic perspective view illustrating, by way of example, the practical design of a recording apparatus according to the invention.

Referring more particularly to Figure 1, I have shown at 10 a basic, highly sensitive indicating instrument in the form of a galvanometer capable of detecting minute electrical currents such as supplied by a photovoltaic cell, thermo-electric element or any other source of minute electrical power. The instrument shown schematically comprises in a known manner a moving coil 12 mounted between a pair of permanent magnet poles N and S and balanced by one or more spiral torque springs 13, the latter also serving as leads to conduct the energizing current from the input terminals 14 to the moving coil in a manner customary in the construction of instruments of this type. Moving coil 12 carries a pointer 15 at the extreme end of which is mounted a metal vane or electrode 16 forming one armature of a variable electrical condenser to be described presently.

I have furthermore shown in Figure 1 a secondary or output device 17 of considerably reduced sensitivity such as a meter or recorder comprising, in the example shown, a moving coil 18 mounted between magnet poles N and S and connected to a pair of fixed terminals 20 and 21 through suitable flexible leads in a manner well understood. The moving coil 18 carries a first pointer or writing pen 22 arranged to cooperate with a chart 23 moving in the direction of the arrow x to produce a record of the pointer deflection. In place of the recorder shown, any other secondary or output device requiring considerably increased power for its operation compared with the input power available for energizing the basic instrument 10, may be provided within the scope of this invention.

Moving coil 18 carries a second pointer 24 extending in the opposite direction to the pointer 22 and having an electrode or metal blade 25 attached to its outer end and arranged to act as a cooperating condenser electrode or armature for the electrode 16 carried by the pointer 15 of the galvanometer or other basic device 10. The electrodes or armatures 16 and 25 may be connected to suitable fixed terminals by way of the associated pointers 15 and 24. In the case of the galvanometer 10, pointer 15 is connected through the torque spring 13 to one of the input terminals 14, while in the case of the recorder 17, pointer 24 is shown connected to a separate terminal 26 through a flexible conductor.

The variable condenser formed by the electrodes 16 and 25 is utilized, according to the present invention, to vary the resonating frequency of a resonant impedance device such as a tuned or resonant circuit. The resonant frequency variations are balanced against the frequency of a source of oscillations by means of a frequency discriminator to produce an off-balance output current suitable for energizing the secondary or output device 17 and to maintain the system in a continuous follow-up balance condition in such a manner that the movement of the recording pen or pointer 22 follows the movement of the input pointer 15 substantially instantly and in exact synchronism. I have shown for this purpose, in the embodiment according to Figure 1, an induction coil 27 connected in parallel to the condenser formed by the electrodes 16 and 25 to provide a resonant or discriminating circuit forming part of a frequency discriminator or conversion system serving to detect any off-balance condition and to supply the output current for energizing the recorder or other translating device. As is understood, the capacity of the condenser 16—25 may be the sole tuning capacity for the resonant circuit or constitute only a part of the capacitative tuning reactance. In the latter case, a fixed condenser may be connected in shunt or in series to condenser 16—25.

The discriminator shown in Figure 1 is of the known space charge type for translating slight capacity changes into substantial current variations. This discriminator, in the example shown, comprises an electron discharge tube 30 having a heating element 31, an equi-potential cathode 32, a first or inner control grid 33, an accelerating or screen grid 34, a second or outer control grid 35 and an anode or plate 36. Any of the well known standard electron tubes such as those known as pentagrid converters, pentodes or the like having the aforementioned electrode arrangement, may be used for the purposes of the invention.

The inner control grid 33 is shown excited by a suitable source 37 supplying a potential of constant high frequency, such as a crystal-controlled or any other highly stabilized oscillator, whereby to cause the electron space current emitted from the cathode 32 to be subjected to fluctuations according to the frequency of the source 37. A condenser-shunted resistance 38 is shown connected in the common grid and plate circuit return lead to the cathode in order to provide suitable operating grid biasing potential in a manner well understood. The screen grid 34 is connected to the positive pole of a suitable high tension space current source in the usual manner and by-passed to ground for high frequency currents by way of a bypass or decoupling condenser.

The tuned or resonant circuit formed by the induction coil 27 and the variable condenser 16—25, is connected between the outer control grid 35 and ground, whereby the steady or direct (quiescent) current $i_a$ flowing in the anode circuit will be subject to a variation in response to the frequency $f$ of the oscillator 37 or, alternatively, in response to the capacity $c$ of the variable condenser 16—25 of the discriminating circuit, as indicated by the characteristic curve in Figure 2.

The function of the frequency converter or discriminator in Figure 1 will be further understood from the following. Electrons emitted from the cathode 32 and initially accelerated by the screen or accelerating grid 34 will in part be absorbed by and will in part pass through the meshes of the latter and travel towards the anode or plate 36. Part of the latter electrons, in moving against the opposing or negative electric field surrounding the outer control grid 35 being at cathode potential or a potential negative with respect to the cathode, will be decelerated in such a manner as to form a dense electron cloud or concentrated electron space charge in the vicinity of the grid 35. The density of this space charge fluctuates in the rhythm of and in phase with the potential on the inner grid 33. The presence of this space charge causes a displacement current to flow in the outer circuit connected to the grid 35 due to electrostatic induction, the phase of this displacement current depending upon the character of the impedance of the tuned or resonant circuit 16—25, 27 connecting the grid 35 with the cathode 32.

More particularly, with the circuit 16—25, 27 being in tune with the space charge fluctuations or operating frequency of the source 37 so as to offer a pure resistive impedance, the induced displacement current and in turn the potential on the grid 35 due to voltage drop through said circuit, will be 90° out of phase with the space charge fluctuations, i. e., in turn, with the potential on the grid 33. This 90° or quadrature phase shift is due to the fact that the induced current is proportional to the rate of change or derivative of the space charge fluctuations. Accordingly, the electron space current flowing to the plate 36 will be subject to a dual control by potentials of like frequency on the control grids 33 and 35, respectively, having a 90° phase displacement with respect to each other. Hence, the effect on the direct or steady (quiescent) plate current $i_a$ (see Figure 2) will be the same as if either of the grids were removed or disconnected from the circuit, resulting in a normal steady plate current $I_0$, depending merely on the steady operating and bias potentials of the tube. This condition corresponds to a normal capacity C of the condenser 16—25 and operating point P substantially in the middle of the characteristic shown in Figure 2.

If the oscillator frequency $f$ increases over or decreases below this value, or, alternatively, if the capacity of the condenser 16—25 increases above or decreases below the capacity C corresponding to the frequency balance between the oscillator and the discriminating circuit, the steady plate current $i_a$ will vary in either sense substantially linearly from the normal value within a range $P_1$—$P_2$ in the manner shown in Figure 2. This plate current is utilized to energize the moving coil 18 of the recorder 17, whereby the latter will respond instantly to any off-balance condition between the operating frequency and the resonant frequency of the discriminating circuit 16—25, 27. The anode 36 is connected for this purpose to terminal 21 of the moving coil 18, whose other terminal 20 is connected to the positive pole of a suitable source of plate current supply indicated by the plus symbol in the drawing. The anode is bypassed to ground for high frequency currents through a condenser 40.

The recorder or other instrument 17 is furthermore shunted by a suitable current source 42 in series with a resistance 41 to buck or balance the normal steady plate current ($I_0$) through the moving coil 18. If the system is designed for operation from A. C. such as from the standard power or house lighting circuits, the buck-out voltage may be supplied from one of the sections of a double-diode rectifier whose remaining section serves to supply the anode and screen operating voltage.

The operation of the system according to Figure 1 will be further understood from the following. Let it be assumed that in the position shown, the capacity of the variable condenser 16—25 is such (capacity C according to Figure 2) that the resonant frequency of the circuit 16—25, 27 equals the operating frequency supplied by the source 37, and that furthermore, the balancing voltage supplied by the source 42 just compensates the steady plate current $I_0$ through the recorder coil 18. Under this condition the pointer or pen 22 will be at rest, i. e., in the center or zero position shown in the drawing as will be the pointer 15 of the basic element, assuming the latter to be a zero-center type instrument.

If now a weak input current applied to the instrument 10 results in the deflection of the electrode 16 in a clockwise direction, the capacity of condenser 16—25 will be increased, resulting in a decrease of the anode current $i_a$ according to Figure 2 and deflection of the recording pointer or pen 22 in an anti-clockwise direction from the position shown in the drawing. This deflection of pointer 22 in the anti-clockwise direction is obtained by proper polarization or choice of the winding sense of the moving coil 18, as is understood. As a result of this deflection, the capacity of the condenser 16—25 will be decreased, thus counteracting or compensating the initial capacity increase. The movement of the electrode 25 will continue until the capacity has again reached its initial value resulting in a frequency balance between the discriminating circuit 16—25, 27 and the operating frequency of the source 37. In other words, the electrode 25 recedes from the electrode 16 to the same extent as the latter approaches the former, and vice versa, in response to an initial current change in the input circuit of the basic instrument or galvanometer 10. In this manner, the electrodes 16 and 25 follow each other in exact synchronism to maintain the balance of the system and to counteract or balance the magnetic force exerted on the moving coil 18 in such a manner as to insure proportionate movement of the pointer or pen 22 in response to the movement of the pointer 15.

If the pointer 15 of the basic instrument is deflected in the opposite or anti-clockwise direction, the capacity of the condenser 16—25 will be decreased, resulting in an increase of the steady plate current $i_a$ and a current flow through the moving coil 18 of the main instrument 17 in the opposite direction, whereby to cause the pointer 22 to be deflected in a clockwise direction and to counteract the initial capacity change of the condenser 16—25 so as to result in an indication or record in the opposite direction in a manner readily understood from the above. If only unilateral currents are to be recorded or translated, the basic element 10 may be of the ordinary type in place of the zero-center instrument shown. In this case the system is so adjusted that the frequency balance corresponds to the zero position of both the primary and secondary instruments, as shown more clearly in Figure 7.

A balanced or follow-up type translating system described hereinabove has the great advantage over externally balanced arrangements using separate balancing means such as torque springs and the like, that all the circuit components such as tube, constants, supply voltages and other characteristics contribute only a secondary function of balancing. The system is inherently stable and due to the substantially instantaneous balancing action, distortion caused by tube or circuit constants are practically eliminated. In this respect the operation of the invention greatly resembles the general function of other inverse feedback type amplifiers or translating systems.

In order to obtain the same capacity change in any position of the primary indicator or pointer 15, the electrodes 16 and 25 may be suitably shaped with marginal configurations following a predetermined law easily determined such as indicated in Figure 7. Alternatively, the basic and secondary instruments 10 and 17 may be mounted in such a manner that the pointers 15 and 24 extend in the same direction in which case the rectangular electrodes 16 and 25 or electrodes shaped in any other suitable manner will insure equal capacity change in all positions. According to a further modification, the electrodes may be mounted at right angles to the shafts of the moving coils 12 and 18 in which case they may be of semi-circular or like configuration in the manner similar to the electrodes of a standard variable electrical condenser.

Thus, referring to Figure 3, the basic and main instruments 10 and 17 are shown in perspective view with the electrodes 16 and 25 being attached to the shafts 15 and 24 of moving coils 12 and 18 at right angle thereto and having a semi-circular shape with one-half of their area overlapping each other in the balance position to obtain a suitable normal capacity (C according to Figure 2). Alternatively, sets of metal vanes or plates may be provided for each of the movable electrodes 16 and 25 connected in parallel and intersecting each other in the manner of a known variable electrical condenser. Any other configuration of the electrodes 16 and 25 differing from the semi-circular shape shown may be employed to suit existing conditions and requirements. The remaining parts such as the modulator 19 and discriminator 29 indicated generally in the drawing and the operation of Figure 3 are substantially the same as in the case of Figure 1 and readily understood from the foregoing.

There is thus provided by the invention a system comprising means for producing a relative frequency departure between the normally balanced frequencies of a source of operating potential and the resonating frequency of a suitable resonant impedance means (tuned circuit, piezo-electric crystal, etc.) in response to a deflection of a basic or primary instrument, and further means for converting said frequency departure into a direct current change proportional to and having a direction depending on the sense of said frequency departure. This direct current serves to energize a secondary or output instrument, the latter in turn being provided with means to counteract or compensate for said frequency departure in such a manner as to automatically maintain the system in a continually balanced condition.

While a space charge type discriminator described has been shown in Figure 1 for illustration, other frequency responsive or detecting devices or circuits may be used for the purpose of the invention, as shown in the further exemplifications of the invention described in the following.

Referring to Figure 4, I have shown a modified recording system according to the invention utilizing the variation of an inductance in place of a variable capacity for balancing the resonant circuit of the frequency discriminator. For this purpose, the pointers 15 and 24 of the primary and secondary instruments are provided with metal vanes or shields 45 and 46, respectively arranged to approach and recede from an induction coil 47 shunted by a fixed condenser 48 and forming the resonant or discriminating circuit connected to the cathode 32 and outer control grid 35 of a frequency discriminator similar to that shown in Figure 1. The metal shields 45 and 46 are so arranged that as the former approaches the coil 47 in response to an input current change in a certain direction, whereby to cause an inductance increase, the latter will recede from the coil to the proper extent, whereby to decrease the inductance until restoring the original balance condition in substantially the same manner understood from the above.

In Figure 4 the operating source or local oscillator is combined with the discriminator tube 30 to dispense with a separate source shown in Figure 1. For this purpose, a regenerative self-oscillating circuit, known as Hartley oscillator in the art, is operatively connected to the cathode, first control grid and screen grid, said circuit comprising a parallel tuned tank circuit 50 connected between the control grid 33 and the screen grid 34 through suitable coupling condensers and having a tap of its inductance connected to the cathode 32, whereby to generate sustained electrical oscillations superimposed upon the steady electron current emitted from the cathode and having a frequency determined by the resonant frequency of the tank circuit 50. As is understood any other regenerative or oscillating circuit connected with the electrodes 32, 33 and 34 may be used for the purpose of this invention.

Figure 4 furthermore differs from Figure 1 in the utilization of the output current supplied by the discriminator 30. It has been found, as described in greater detail in my U. S. Patent No. 2,248,197, that in addition to the steady or direct output current change according to Figure 2, the output or plate current contains a high frequency component which is amplitude modulated in accordance with the tuning frequency changes of the resonant discriminating circuit 47, 48. This high frequency component is amplified by a stabilized high frequency amplifier 51 and rectified or detected, preferably by means of a linear detector 52 connected to a condenser-shunted load resistor 53. Accordingly, the rectified voltage supplied the resistor 53 varies in proportion to the relative frequency departure between the circuit 47—48 and the operating frequency in very much the same manner as shown in Figure 2. This voltage is utilized to energize the moving coil 18 of the output instrument 17. If desired, the normal or average rectified current corresponding to the unmodulated carrier amplitude may be balanced or compensated, such as by a balancing source as shown at 42 in Figure 1. Alternatively, the normal output current may be balanced by a torque spring 54 restraining the movement of the moving coil 18 of the instrument 17. In the latter case, the system may be used for telemetering purposes as indicated by the instrument 55 connected in series with the moving coil 18 and located at a point remote from the recorder 17.

Figure 5:
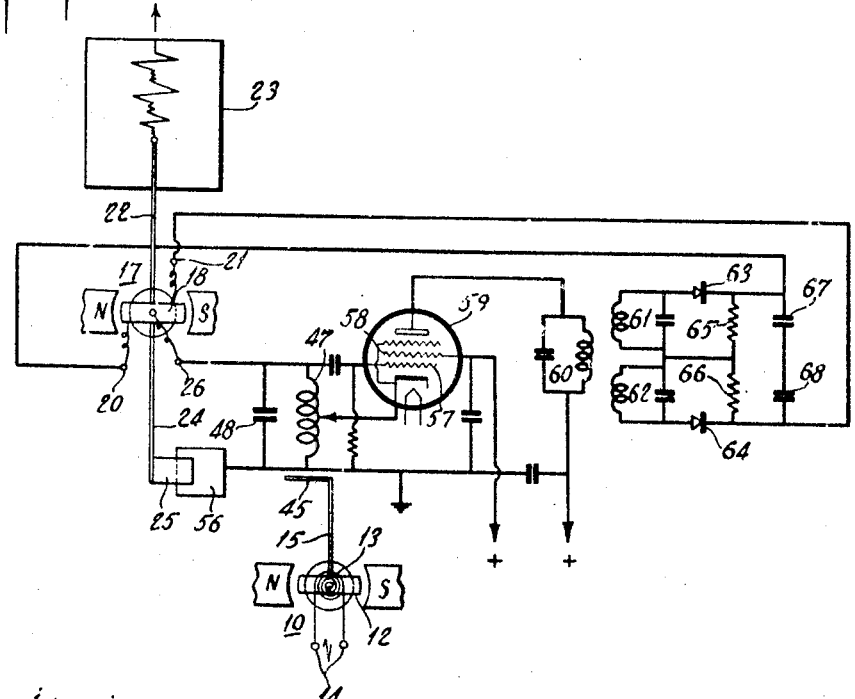

According to a further modification of the invention, the resonant frequency variations in response to an initial unbalance of the system, are utilized to frequency modulate a carrier or operating frequency, which latter is translated and detected by means of a suitable frequency discriminator for producing an off-balance output current energizing the secondary instrument or recorder. An arrangement of the latter type is shown in Figure 5. The latter further differs from the preceding illustrations in that the frequency variation of the resonant circuit is effected partly by variation of the capacity and partly by variation of the inductance that is constituting a combination of the methods shown by Figures 1 and 4, respectively. For this purpose, the pointer 15 of the basic instrument 10 carries a metal vane 45 arranged to control the inductance 47, while the pointer 24 of the secondary instrument carries a metal electrode 25 cooperating with a fixed electrode 56 to provide a variable condenser connected in parallel to the fixed condenser 48 forming part of the anti-resonant or tank circuit of a self-excited oscillator operatively associated with the cathode, first control grid 57 and screen grid 58 of an electron coupled oscillator tube 59. The arrangement is such that the frequency change as a result of an initial variation of the inductance 47 by a deflection of the pointer 15 is counteracted by a corresponding change of the capacity of the condenser 25—56 due to a corresponding off-balance current produced and applied to the instrument 17 in a manner as will become apparent from the following.

Figure 5A:
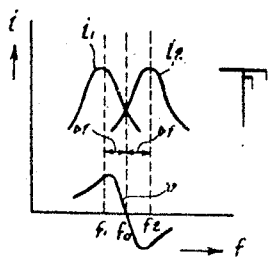

The frequency modulated output oscillations of the electron coupled oscillator 59 are applied by way of the tuned or resonant plate circuit 60 to a balanced frequency discriminator of the off-tuned type comprising, in the example shown, a pair of resonant circuits 61 and 62 in coupling relation to the circuit 60 and tuned to frequencies $f_1$ and $f_2$ above and below the center or carrier oscillating frequency $f_0$ by substantially equal frequency differentials $\Delta f$ as shown in Figure 5a. In the latter $i_1$ and $i_2$ represent the resonance curves for the circuits 61 and 62 representing the high frequency currents as a function of the frequency $f$. The currents $i_1$ and $i_2$ are separately rectified by the aid of rectifiers 63 and 64, preferably a pair of diodes, and the rectified currents are combined in opposition by means of a pair of serially connected load resistors 65 and 66 shunted by smoothing condensers 67 and 68, respectively, in a manner well understood and known in the art.

In a circuit of this type, the voltage drop $v$ between the outer open terminals of the resistors 65 and 66 varies in substantially the same manner as shown in Figure 2 and indicated by the curve $v$ in Figure 5a. This output voltage is utilized to energize the recorder 17 in substantially the same manner as shown in the preceding illustrations. Accordingly therefore, by the proper design of the various circuit constants and parameters and polarization of the respective exciting currents or potentials, a continuous balance and substantially synchronous or follow-up relation between the basic and secondary instruments may be obtained in substantially the same manner and readily understood from the above.

Referring to Figure 6, I have shown a further modification of the invention utilizing a pair of variable condensers in parallel and controlled by the prime and secondary instruments, respectively. For this purpose, the electrode 16 attached to the pointer 15 of the basic instrument 10 cooperates with a fixed electrode 69 and the electrode 25 attached to the pointer 24 of the main instrument 17 cooperates with the fixed electrode 56. The two variable condensers thus obtained are effectively connected in parallel to the oscillator tank circuit inductance 47 and the design and polarization of the elements is chosen in such a manner that an increase or decrease of the capacity of condenser 16—69 due to a deflection of the primary instrument is instantly counteracted or balanced by a corresponding decrease or increase, respectively, of the capacity 25—56 due to deflection of the main instrument in such a manner as to restore and maintain a continued balance of the system.

I have furthermore shown in Figure 6 a different type of frequency discriminator especially suitable for using a piezo-electric crystal as a resonating or discriminating means and resulting in an extreme sensitivity or slope of the operating curve shown in Figure 2. This discriminator is similar to the one shown in Figure 1 and comprises a multi-grid electron tube 71 having an outer control grid 72 excited by the frequency modulated oscillations supplied by the oscillator 59 by way of a tuned coupling transformer 70 in the plate circuit of the oscillator tube. The inner control grid 73 separated from the grid 72 by an accelerating or screen grid in a manner similar to Figure 1 is connected to ground or cathode through a piezo-electric crystal 74 shunted by a high ohmic resistance 75 to provide a direct current path between the grid and cathode. The resonating frequency of the crystal 74 is chosen to correspond to the normal or center frequency of the oscillations generated by the tube 59. Alternatively, the function of grids 72 and 73 may be interchanged without affecting the function and operation of the discriminator.

Thus, under normal conditions, that is with the oscillations being unmodulated, the average plate current will have a value of $I_0$ as shown in Figure 2. If the frequency of the oscillator changes or becomes modulated due to a deflection of the pointer 15 of the basic instrument, the average plate current will vary in the manner shown in Figure 2 due to the action of a concentrated space charge produced near the grid 72 as explained in detail hereinabove. The current of the screen grid undergoes a similar variation, as the plate current with a phase opposite to the plate current variations, or with the slope of the operating curve being reversed with respect to the slope as shown by the dotted lines in Figure 2.

In Figure 6 this phenomenon is utilized to dispense with a separate compensating battery to balance the steady output current by connecting the moving coil 18 of the output instrument directly to the plate and screen electrodes of the of the discriminator 71. By proper design of the voltage drop resistors 76 and 77 in the plate and screen circuits, the normal operating current through the coil 18 may be balanced. The system otherwise functions in a manner substantially similar to the preceding arrangements as will be readily understood from the foregoing.

Referring to Figure 7 I have shown a further embodiment of the invention similar to Figure 1 utilizing a so-called phase shift type discriminator and showing a system adjusted for recording currents varying in one direction only. For this purpose, the pointers 15 and 24 are shown in the zero position and the electrodes 16 and 25 are so shaped as to insure equal capacity change in any deflecting position. The system is adjusted for frequency balance in the zero position as shown, whereby the operation will take place along one branch of the operating curve.

The condenser formed by the electrodes 16 and 25 is connected in shunt in the tank circuit 47, 48 of a Hartley type oscillator associated with the cathode, inner control grid and screen grid of an electron coupled oscillator 30 and the frequency modulated oscillations developed in the resonant plate circuit 80 are applied to a balanced phase shift type discriminator comprising a secondary tuned circuit 81 in coupling relation with the circuit 80 and connected to a pair of serially arranged rectifying circuits comprising rectifiers 82 and 83 and condenser-shunted load resistors 84 and 85. Both the primary and secondary circuits 80 and 81 are tuned to the center or unmodulated frequency $f_0$ of the oscillator 30. The center tap of the secondary circuit inductance is connected to the high potential side of the primary circuit 80 through a coupling condenser on one hand, and to the common junction point of the load resistors 84 and 85 through a high frequency impedance such as choke coil 86, on the other hand. The rectifiers 82 and 83 are polarized in opposite directions, whereby the rectified voltage developed between the outer ends of the resistors 84 and 85 varies in a manner as shown by the curve $v$ in Figure 5a as a function of the relative frequency departure between the resonant frequency of the circuits 80 and 81 and the oscillating frequency supplied by the oscillator 30. The function of this discriminator due to a variable phase shift between the primary and secondary voltages of the resonant transformers 80, 81 is well known and changes from the specific circuit shown may be made in accordance with the many modifications described in the prior art.

Figure 7 shows a photovoltaic cell 90 energizing the basic instrument or galvanometer 10 as one illustration of the numerous practical uses and applications of the invention.

In order to improve the stability of a system according to the invention it is desirable to use a highly constant operating frequency. This requirement can be easily met by using an oscillator of high stability embodying a piezo-electric crystal or other frequency stabilizing means known in the art.

It is furthermore understood that the invention is by no means limited to the use of an electrical basic device such as a galvanometer shown in the drawings, but may be used in connection with any type of indicator having a delicate and highly sensitive movable element corresponding to the pointer 15 in the drawings such as a thermometer, barometer, etc., the deflection of which is to be transferred into proportional displacement of a relatively heavy secondary device such as a recorder, remote control indicator or the like.

In its broad aspects, therefore, the invention provides a relatively simple and efficient means to translate mechanical displacement of a relatively delicate and highly sensitive basic element into proportionate synchronous movement of a relatively heavy or coarse secondary element, wherein the movement of said basic element may have any origin such as electrical, thermal or in response to any other cause or condition.

According to a modification of the invention the output or secondary element may be designed for expanded scale deflection compared with the basic element. This can be accomplished in a simple manner where the movable members of the elements separately affect the frequency relation between the operating frequency and the resonating frequency of the discriminating circuit, such as in the case of Figures 4, 5 and 6. In the latter, the inductance or capacity changes effected by the basic and secondary devices in response to an initial movement of the basic element, may be different such as by a different spacing of the metal members 45 and 46 from the coil 47 or by a different design of the electrodes 25—56 and 16—69 in Figure 6, in such a manner as to obtain a greater movement of the secondary element compared with and in response to an initial deflection of the primary element in order to restore and maintain the balance condition, or in other words resulting in an expanded scale deflection of the secondary element.

It will be evident from the foregoing that the invention is not limited to the specific circuits, arrangements of parts and details shown and disclosed herein for illustration, but that the underlying basic principle and thought are susceptible of numerous variations and modifications coming within the broader scope and spirit of the invention as defined in the appended claims. The specifications and drawings are accordingly to be regarded in an illustrative rather than in a limiting sense.

I claim:

1. An electrical measuring system comprising an input device having a movable element responsive to variations of a quantity to be measured and provided with a first electrode actuated thereby; an output device actuatable in response and proportion to an electric current applied thereto and having a movable element provided with a second electrode, actuated thereby, said electrodes being arranged in relatively spaced relationship to form a single variable condenser; a frequency converter-amplifier comprising an electronic tube having at least a cathode, an anode, a pair of control grids and a screen grid interposed between said control grids, a resonant impedance means connected between said cathode and one of said control grids, a source of auxiliary high frequency voltage having a frequency normally relatively equal to the resonant frequency of said impedance means and connected between the other of said control grids and said cathode, to produce a direct anode current having an amplitude varying in sense and magnitude in proportion to the relative frequency departure between said source and the resonant frequency of said impedance means; means for varying the relative frequency between said source and said impedance means by said variable condenser; and further means for actuating said output device by said direct anode current, to substantially instantaneously restore the frequency balance between said source and said impedance means and to maintain a continuous follow-up relation between the movable elements of said input and said output device.

2. An electrical measuring system comprising an input device having a movable element responsive to variations of a quantity to be measured and provided with a first electrode actuated thereby, an output device actuatable in response and proportion to a direct current applied thereto and having a movable element provided with a second electrode actuated thereby, said electrodes being arranged in relatively spaced relationship to form a single variable condenser; a frequency converter-amplifier comprising an electronic tube having at least a cathode, an anode, a pair of control grids and a screen grid interposed between said control grids, a resonant impedance means connected between said cathode and one of said control grids, a source of auxiliary high frequency voltage of constant frequency having a frequency normally relatively equal to the resonant frequency of said impedance means and being connected between the other of said control grids and said cathode, to produce a direct anode current having an amplitude varying in sense and magnitude in proportion to the relative frequency departure between said source and the resonant frequency of said impedance means; said condenser being arranged to form an effective tuning element and said resonant impedance means, to control the relative frequency between said source and the resonant frequency of said impedance means; and means for actuating said output device by said direct anode current, to substantially instantaneously restore the frequency balance between said source and said impedance means and to maintain a continuous follow-up relation between the movable elements of said input and said output device.

3. An electrical measuring system comprising an input device having a movable element responsive to variations of a quantity to be measured and provided with a first electrode actuated thereby; an output device actuatable in response and proportion to a direct current applied thereto and having a movable element provided with a second electrode actuated thereby, said electrodes being arranged in relatively spaced relationship to form a single variable condenser; a frequency converter-amplifier comprising an electronic tube having at least a cathode, an anode, a pair of control grids and a screen grid interposed between said control grids, a resonant circuit constituted by an inductance coil and said condenser in parallel and being connected between one of said control grids and said cathode, a source of auxiliary high frequency voltage having a constant frequency normally relatively equal to the tuning frequency of said circuit and being connected between the other of said control grids and said cathode, to produce a direct anode current having an amplitude varying in sense and magnitude in proportion to the relative frequency departure between said source and the tuning frequency of said circuit; and means for actuating said output device by said direct anode current, whereby to substantially instantaneously restore the frequency balance between said source and the tuning frequency of said circuit and to maintain a continuous follow-up relation between the movable elements of said input and said output device.

KARL RATH.

REFERENCES CITED

The following references are of record in the file of this patent:

UNITED STATES PATENTS

| Number | Name | Date |
|---|---|---|
| 2,126,910 | Moseley | Aug. 16, 1938 |
| 2,165,510 | Rosene | July 11, 1939 |
| 2,280,019 | Alexanderson et al. | Apr. 14, 1942 |
| 2,379,689 | Crosby | July 3, 1945 |
| 2,396,091 | DeBey | Mar. 5, 1946 |